United States Patent [19]

Holley

[11] 4,119,010
[45] Oct. 10, 1978

[54] MUSIC TRAINING DEVICE

[76] Inventor: Anthony G. Holley, 265 Hicks St., Brooklyn, N.Y. 11201

[21] Appl. No.: 716,678

[22] Filed: Aug. 23, 1976

[51] Int. Cl.² ............................................. G09B 15/00
[52] U.S. Cl. .................................................. 84/470 R
[58] Field of Search ..................................... 84/470 R

[56] References Cited
U.S. PATENT DOCUMENTS

| 138,714 | 5/1873 | Thompson et al. | 84/470 |
| 672,678 | 4/1901 | Kitching | 84/470 |
| 1,754,459 | 4/1930 | Cash | 84/470 |
| 2,888,849 | 6/1959 | Humphrey et al. | 84/470 |
| 3,256,765 | 6/1966 | Siegel | 84/470 |

*Primary Examiner*—Stephen J. Tomsky

[57] ABSTRACT

The invention is a music training service that visually and audibly assists a music student in associating the location of music notes on the lines and spaces of a simulated staff with the musical pitches of the notes.

4 Claims, 9 Drawing Figures

4,119,010

MUSIC TRAINING DEVICE

This invention relates generally to training aids and more particularly to a novel learning aid for teaching music students the elementary rudiments of learning to read musical pitches combined with sound producing means to reproduce the sounds of the various musical pitches.

The invention essentially comprises one or more musical staves having integral manually operable means that provide representation of a full complement of various notes normally present on the lines and spaces of the staff or staves. Actuation of the manually operable note representations permits the student to audibly associate the sound produced with the position of the note representation on the staff.

Accordingly, one of the principal objects of the invention resides in the provision of a musical training aid having an integral full complement of manually operable note representations in a musical staff-like device that when manually operated will produce a musical note or combinations of notes selectively.

Another object of the invention is to provide, in a musical training device, pluralities of manually operable note representations having respective common sound producing means that when manually operated in sequential order will repetitively produce the same tonal sound of note representations of the same line and/or space occupied on the musical staff.

Still another object resides in the provision of a device having plural note representations that are manually operable in pluralities to produce sounds representative of musical chords or double pitches.

A further object is to provide in an invention of the class described, pluralities of sound producing note representations that can be selectively and sequentially manually operated to produce a series of musical notes to produce a musical tune and/or a musical melody and to transpose one key to a different key.

Still another object of the invention resides in a musical teaching aid that permits the learning student to read musical scores and duplicate the score notes to associate note sounds with note locations on the simulated staff as the note representations of the simulated staff are manually depressed to produce the respective musical tones associated with the note representations.

Another object of the invention is a simulated staff device having pluralities of notes manually actuatable to produce musical scores and means to apply overlay musical tune teaching means that directly instructs a student using the device to manually operate selected note representations on the overlay to produce sound representative of the musical score.

Other ancillary objects will be, in part, hereinafter apparent and will be, in part, hereinafter pointed out.

Figure 1:
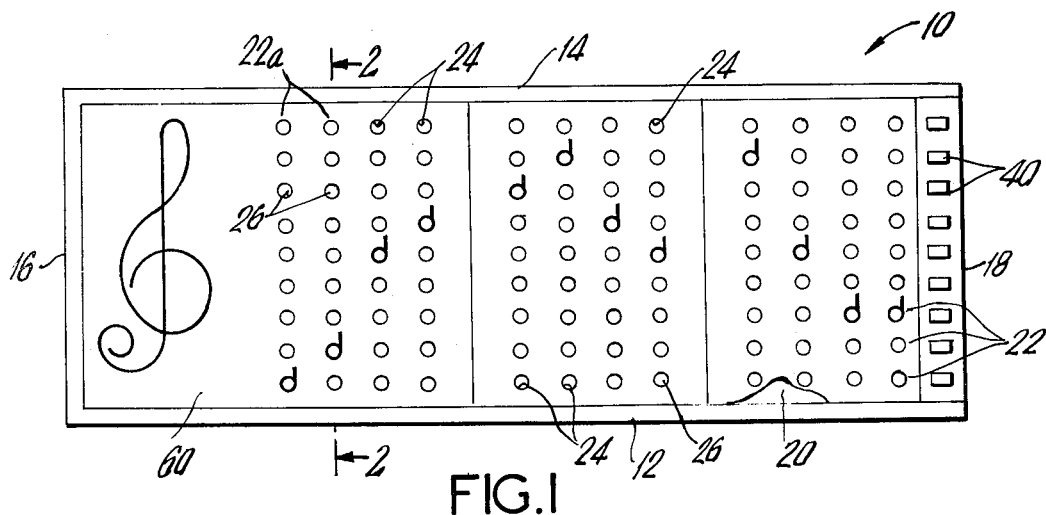
FIG. 1 is a plan elevation of the musical training device with an overlay disposed thereon.
Figure 2:
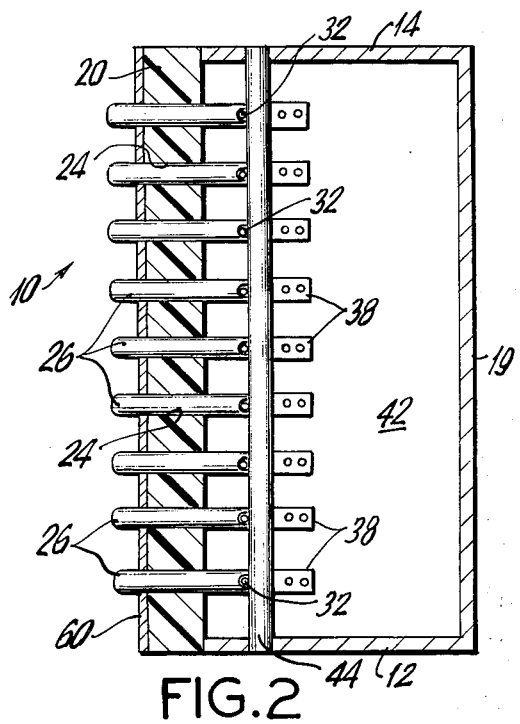
FIG. 2 is a cross-sectioned view taken along line 2—2 of FIG. 1.
Figure 3:
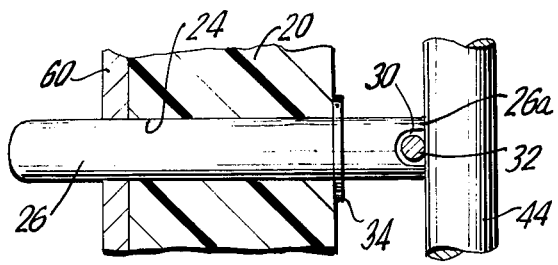
FIG. 3 is an enlarged detail in partial cross-section to illustrate the normal inactive position of an actuatable peg.
Figure 4:
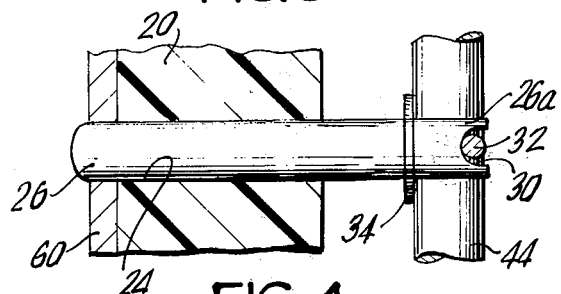
FIG. 4 is an enlarged detail in partial cross-section of the peg shown in FIG. 3, with the peg depressed in actuated position.

Referring to the drawings in detail, 10 generally designates the musical training device, having longitudinal side walls 12 and 14, transverse side walls 16 and 18, bottom wall 19, and top cover 20. Cover 20 is perforated to provide plural horizontal rows 22 of apertures 24 that extend from the external surface to the internal periphery of cover 20.

As shown in FIG. 1, the plural apertures 24 are further disposed in aligned vertical relationship to produce a row 22a of nine vertical spaced apertures.

The nine vertical apertures each have residing therein a peg 26 for purposes hereinafter appearing.

In the present invention, the vertical row 22a of apertures 24 with pegs 26 therein represent the musical notes on a scale conventionally identified as lines and spaces with the lines (notes) in musical order from the bottom of the scale being known as E, G, B, D, and F, and the spaces (notes) F, A, C, and E in ascending order. This method of representing musical notes in a tune or scale relation is well known to those skilled in the art and need not be further described herein.

The purpose for providing plural rows 22a of pegs 26 will be hereinafter described.

Referring to FIG. 1, it will be noted that plural rows 22a are provided and the specific number shown is for illustrative purposes only, and is not to be considered critical other than the reasonable useful size of the device 10.

As shown in FIGS. 2, 3, 4, and 5, each peg 26 is disposed in aperture 24 in cover 20 to project upwardly above the cover 20 in normal inactive relation. The interior terminal portion 26a of each peg 26 is formed with a tapered recess 30 in which a cord 32 resides. A concentric seal 34 is affixed to each peg 26 to effectively seal aperture 24, as will be hereinafter described.

Figure 5:
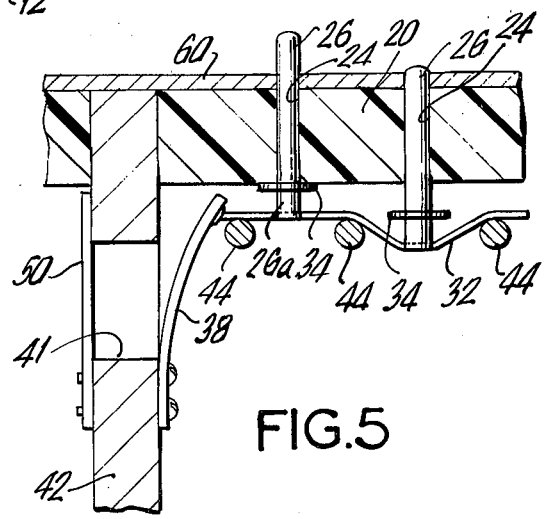
FIG. 5 is an enlarged detail of one of the sound producing reeds and its associated valve shown in open position when an associated peg is depressed.
Figure 6:
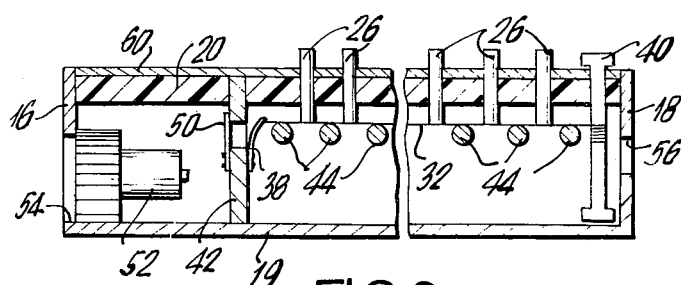
FIG. 6 is a partial longitudinal cross-section illustrating the relationship of the pegs, tension rods, valves to the air pressure chamber.
Figure 7:
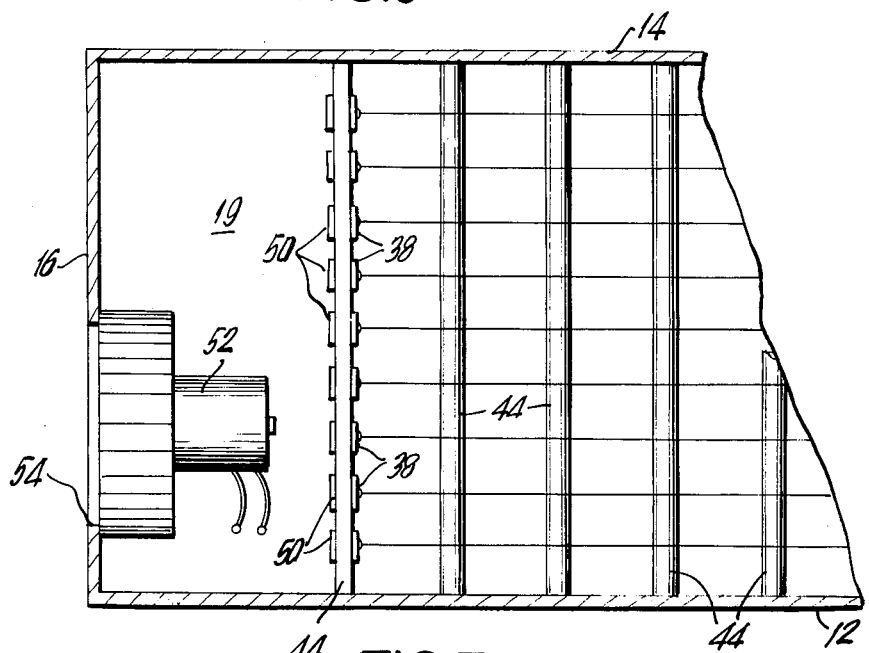
FIG. 7 is a detail to illustrate the valve opening cords and tension rods.

Referring to FIGS. 5, 6, and 7, cords 32 are longitudinally disposed in aligned relation with pegs 26 in the horizontal rows 22 and terminate on one end attached to a valve 38 that is normally spring urged closed. The other end of each cord 32 is secured to a retatable key 40 for cord tensioning reasons. With all pegs 26 in normal upwardly projecting relation, cord 32, associated with each horizontal row 22 is normally extended in coaxial spaced alignment. With all pegs 26 so disposed, valves 38 are in closed relation, effectively sealing apertures 40 in inner wall 42 of device 10.

Disposed transversely of the cords 32 are plural tensioning rods 44 extending from and secured to opposite walls 12 and 14 in peripheral engagement with cords 32. Rods 44 are positioned intermediate adjacent rows 22a of pegs 26. Thus, when a peg 26 is manually depressed, cord 32, associated therewith is distorted downwardly between adjacent rods 44 to stretch and extend cord 32 to open valve 38 attached thereto.

Valve 38, when opened, permits air to be drawn from the exterior of device 10 and through reed 50, open valve 38 and aperture 40 to activate reed 50 to produce a tonal audible sound having an intensity and pitch musically matching the particular peg 26 that is depressed. The air source is a fan 52 having an inlet port 54 in end wall 16 of the device. An outlet port 56 is provided in the opposite end wall 18 of the device to permit the ingress and egress of sufficient air to activate reeds 50.

Each of the reeds 50 is tuned to produce the pitch of the respective notes on pegs 26 in aligned vertical relation to produce the musical sounds and tones corresponding to the particular peg 26 that is manually depressed in ascending order for each vertical row 22a.

Obviously, the progressive actuation of a peg 26 in a vertical row 22a in a sequence will produce a tune or melody to correlate the actual sound with the designated representation of the notes.

With the depression of a peg 26, the cord 32 opens the valve 38 that is connected to the displaced cord 32. The actuation of the peg 26 of the adjacent vertical row 22a of pegs of the same line or space prior to releasing the first actuated peg 26 permits the student to sustain the note produced by the related reed 50. Thus, a further element of music is readily practiced and learned by the student, i.e. the continuous audible sound variations.

To facilitate the learning process, variable overlays 60 are provided with perforations that permit the overlay 60 to be disposed on the plural pegs 26 on device 10. Indicia on the overlay 60 will direct the student to depress the proper peg 26 where the said student is attempting to create the sounds of the musical score or training directive.

Therefore, an individual trainee may, by applying differing overlays 60 and pressing the indicated note representing pegs 26, perform to produce musical notes or sounds indicative of the musical scale to associate visual scale notes with audible equivalent sounds.

Further, the timing of note actuation may be a further indicia element on overlay 60 to teach musical timing per bar of music when actual notes are produced. The basic device 10 is readily adapted to produce singular variables and a multitude of combinations of sequential notes for musical training purposes.

Figures 8, 9:
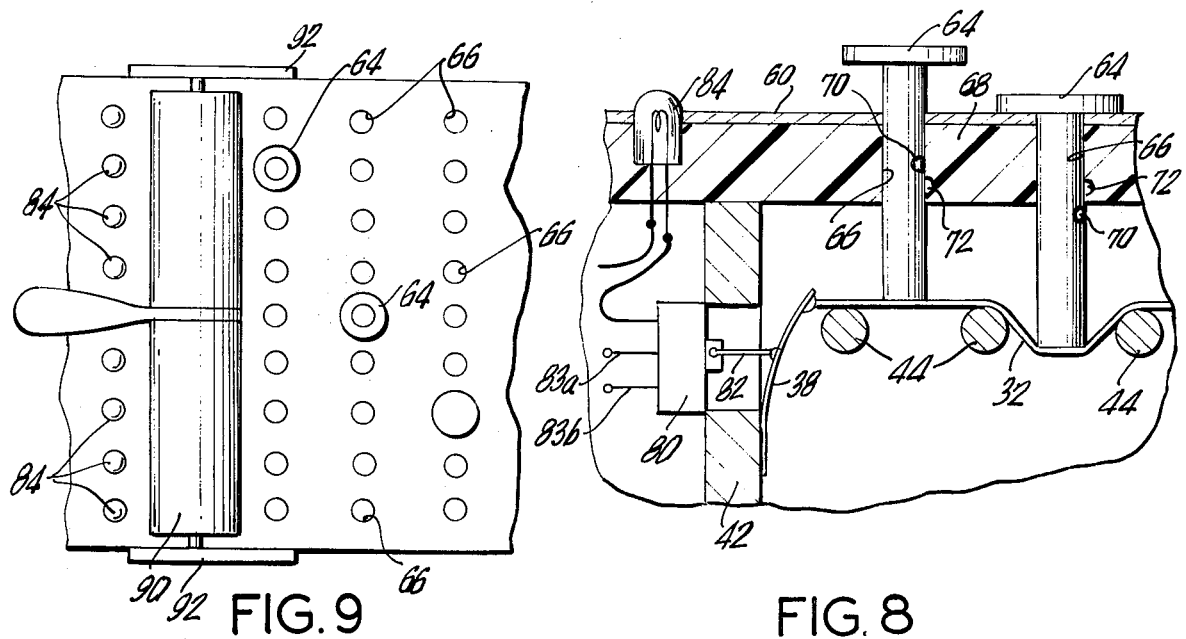
FIG. 8 is a detail view illustrating a second embodiment of the invention wherein the pegs are removable from the device and switches are substituted for the sound producing reeds.
FIG. 9 is a plan detail of the embodiment shown in FIG. 8 illustrating a sequential peg actuating member that can be utilized to actuate the preselected pegs at desired timing to reproduce the pitches in musical time relationship.

A further embodiment of the invention, figures 8 and 9 illustrate removable pegs 64 that are adapted to be inserted in apertures 66 in cover 68. Each peg 64 is provided with a ball spring-urged detent 70 that will reside in an intermediate recess 72 located in the inner periphery of aperture 66 when the peg 64 is partially depressed.

When fully depressed, the detent 70 will be disposed below the cover 68 to alternatively position the peg 64 in a fully depressed relation.

Obviously, the degree of depression of a peg 64 will effect the tension on the related cord 32 to open the valve 38 a varying degree. Thus the intensity of the produced sound can be selectively varied.

While the embodiment of FIGS. 8 and 9 is directed to electrical controls for sound producing means, the hereinbefore reed would respond in a similar sound intensity variation.

If air and reeds were utilized, the detents 70 would be eliminated to permit free vertical movement of the pegs 26.

The embodiment shown in FIGS. 8 and 9, controls individual switches 80 having plural contacts, not shown, that are closed in accordance with the tension of the cord 32. Each switch 80 has an actuator 82 that is attached to valve 38 and is controlled thereby. The switches control remote electronic sound producing means, which are not shown or described herein but are identified as being connected to conductors 83a and 83b. Anyone skilled in the electronic art is familiar with such switch control. An additional feature of switch control energizes a lamp 84 when the related switch is actuated.

The plural lamps 84 represent the pitches of a staff and thus, the sound producing peg actuation also produce a visual light indication to correlate the selected pitch or note with the line or space of the staff.

This visual musical training air permits hearing handicapped persons to learn music.

As shown in FIG. 9, a removable roller 90 disposed on guide means 92 may be disposed on the device to be manually moved over the selected pegs 64 to sequentially actuate each peg in a desired time relationship which will permit the student to practice musical timing or beat. Such timing determines the tempo of the musical bars that are being utilized in the training overlay 60.

It is quite apparent that many variations of the training device are possible and applicable to various musical instruments within the scope of the hereinbefore described device. It will be apparent to one skilled in the art, that electronic sound producing devices could be substituted for the described air type to produce the desired visual-sound relationship.

While there has been shown and described plural embodiments of the invention, it will be understood that changes and modifications could be made without deviating from the scope of the invention as setforth in the following claims.

The invention claimed is:

1. In a music training aid device of the class described comprising, in combination,
   a. a housing having plural aligned vertical rows of equally spaced apertures in the face thereof;
   b. each of said apertures being located on a line or space of a simulated music staff;
   c. manually operable pegs associated with each aperture;
   d. normally inactive plural sound producing means;
   e. each of said plural sound producing means being related to the series of apertures and pegs in a horizontal line representative of the line or space in the music staff;
   f. and means to activate said normally inactive sound producing means when a manually operable peg is manually operated to produce a sound representative of the musical pitch of an operated peg of series of pegs in a horizontal line in its related line or space of the music staff and to sustain said sound producing means to produce sound as long as said is operated.

2. In a device, as set forth in claim 1,
   a. an overlay having plural apertures similar to and in alignment with the apertures in said housing;
   b. musical representations disposed on said overlay to instruct a student to manually operate selected pegs to produce predetermined sequential pitches of musical sounds.

3. In a device, as set forth in claim 1,
a. and said pegs being manually operable to various positions
b. and said sound reproducing means being responsive to the various positions of said manually operable pegs to vary the intensity of the pitch created by said sound producing means.

4. In a device, as set forth in claim 1,
a. and said sound producing activating means including a spring tensioned cord;
b. each of said cords being connected to a specific pitch sound producing means;
c. and said pegs being manually operable to engage and increase the tension on said cords to activate the sound producing means when said pegs are manually depressed.

* * * * *